United States Patent
Mitsutani (10) Patent No.: US 8,604,751 B2
(45) Date of Patent: Dec. 10, 2013

(54) CHARGING SYSTEM FOR VEHICLE AND METHOD FOR CONTROLLING CHARGING SYSTEM

(75) Inventor: Noritake Mitsutani, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 322 days.

(21) Appl. No.: 13/146,894

(22) PCT Filed: Feb. 3, 2009

(86) PCT No.: PCT/JP2009/051758
§ 371 (c)(1), (2), (4) Date: Jul. 28, 2011

(87) PCT Pub. No.: WO2010/089843
PCT Pub. Date: Aug. 12, 2010

(65) Prior Publication Data
US 2011/0309793 A1    Dec. 22, 2011

(51) Int. Cl.
*H02J 7/00*    (2006.01)
(52) U.S. Cl.
USPC ............................ 320/109; 320/137; 320/134
(58) Field of Classification Search
USPC ........................................................ 320/109
See application file for complete search history.

(56) References Cited

U.S. PATENT DOCUMENTS

| | | | | |
|---|---|---|---|---|
| 6,075,344 A | * | 6/2000 | Kawai | 320/134 |
| 6,275,006 B1 | * | 8/2001 | Koike et al. | 320/125 |
| 2002/0079869 A1 | * | 6/2002 | Fujiwara | 320/157 |
| 2005/0231168 A1 | * | 10/2005 | Lin | 320/134 |
| 2009/0033288 A1 | * | 2/2009 | Takano et al. | 320/137 |
| 2010/0076636 A1 | * | 3/2010 | Ichikawa | 701/22 |

FOREIGN PATENT DOCUMENTS

| | | |
|---|---|---|
| JP | 5-300667 A | 11/1993 |
| JP | 7-194015 A | 7/1995 |
| JP | 2001-339803 A | 12/2001 |
| JP | 2008-187884 A | 8/2008 |
| JP | 2008-236930 A | 10/2008 |

* cited by examiner

*Primary Examiner* — Arun Williams
(74) *Attorney, Agent, or Firm* — Kenyon & Kenyon LLP (57) ABSTRACT

A charge control device includes a charge power detection unit for detecting charge power supplied to a power storage device; a target value determination unit for determining a target value of the charge power to the power storage device; a feedback control unit for correcting the target value based on a difference between the charge power and the target value to generate the power command value; a supply power detection unit for detecting supply power output from the charger; and a charge abnormality monitoring unit for, in a case where the charge power is decreased below a first threshold value and the supply power is decreased below a second threshold value, confirming a diagnosis that an abnormality occurs in the charger when the target value falls within an abnormality detectable range, and suspending performing a diagnosis of an abnormality in the charger when the target value is out of the abnormality detectable range.

5 Claims, 6 Drawing Sheets

CHARGING SYSTEM FOR VEHICLE AND METHOD FOR CONTROLLING CHARGING SYSTEM

This is a 371 national phase application of PCT/JP2009/051758 filed 3 Feb. 2009, the content of which is incorporated herein by reference.

TECHNICAL FIELD

The present invention relates to a charging system for a vehicle and a method for controlling the charging system, and particularly to a charging system for a vehicle equipped with a power storage device which can be charged from outside the vehicle, and a method for controlling the charging system.

BACKGROUND ART

In recent years, a vehicle such as an electric vehicle and a hybrid vehicle equipped with a motor for driving the vehicle and a battery for driving the motor has been actively developed as an environmentally-friendly vehicle.

Japanese Patent Laying-Open No. 07-194015 (Patent Document 1) discloses a charge control device for charging a battery mounted in an electric vehicle. The charge control device receives an input of the detected value of each of an abnormality detection sensor and a current sensor. When determining that the battery normally operates, the charge control device feeds back the value of the current sensor so as to adjust a power control unit to supply an optimum charging current to the battery for performing charging. In the event of detection of the state where the battery should not be charged, such as a state where an abnormality occurs in the battery or the battery is fully charged, the electric power output from the power control unit is adjusted such that the detected value of the current sensor is approximately equal to 0. Accordingly, the electric power supplied to the fan and the like operating when an abnormality occurs in the battery is directly supplied from the charge control device, but not discharged from or supplied to the battery having an abnormality or fully charged.

Patent Document 1: Japanese Patent Laying-Open No. 07-194015

DISCLOSURE OF THE INVENTION

Problems to be Solved by the Invention

According to the technique disclosed in the above-described Japanese Patent Laying-Open No. 07-194015, a temperature sensor is used to monitor the temperature of the battery in order to detect an abnormality of the battery. However, in the system configured to allow the battery to be charged from an external power supply, it is desirable to detect not only an abnormality in the battery but also an abnormality in the charger. The above-described detection of abnormalities in the system for charging including a charger can be accomplished based on the significant decrease in monitor values obtained by monitoring the battery charge power and the charger supply power.

However, in the case where the charge power cannot be increased, for example, due to an extremely low temperature of the battery, since the charge power is basically limited, a failure occurring in the charger cannot be detected, and thus, the charging operation cannot be ended.

An object of the present invention is to provide a charging system for a vehicle capable of normally determining whether or not a failure occurs in the system for charging under the circumstances where charging is limited, to thereby allow an increase in the number of charging opportunities, and a method for controlling the charging system.

Means for Solving the Problems

In summary, the present invention provides a charging system for a vehicle for charging a power storage device mounted in the vehicle. The charging system includes a charger configured to supply electric power from a power supply external to the vehicle so as to charge the power storage device; and a charge control device for controlling the charger by generating a power command value to the charger. The charge control device includes a charge power detection unit for detecting charge power supplied to the power storage device; a target value determination unit for determining a target value of the charge power to the power storage device; a feedback control unit for correcting the target value based on a difference between the charge power and the target value to generate the power command value; a supply power detection unit for detecting supply power output from the charger; and a charge abnormality monitoring unit for, in a case where the charge power is decreased below a first threshold value and the supply power is decreased below a second threshold value, confirming a diagnosis that an abnormality occurs in the charger when the target value falls within an abnormality detectable range, and suspending performing a diagnosis of an abnormality in the charger when the target value is out of the abnormality detectable range.

Preferably, in the case where the charge power is decreased below the first threshold value and the supply power is decreased below the second threshold value, the charge abnormality monitoring unit confirms a diagnosis that an abnormality occurs in the charger and stops an operation of the charger when the target value falls within the abnormality detectable range, and suspends performing a diagnosis of an abnormality in the charger and stops the operation of the charger when the target value is out of the abnormality detectable range.

Preferably, the vehicle includes an auxiliary machine capable of being driven by a part of the electric power output from the charger. The power storage device includes a first power storage device connected to a power supply path to the auxiliary machine, and a second power storage device to which an output of the charger is connected. The charging system for a vehicle further includes a first voltage converter performing voltage conversion between a voltage of the first power storage device and a supply voltage to an electric load, and a second voltage converter performing voltage conversion between a voltage of the second power storage device and the supply voltage. The charge control device is configured to control the first and second voltage converters to select one of the first and second power storage devices as a target to be supplied with the charge power from the charger.

Preferably, the vehicle includes a motor for driving the vehicle operating with the electric power received from the power storage device, and an internal combustion engine used for driving the vehicle in combination with the motor.

In another aspect, the present invention provides a method for controlling a charging system for charging a power storage device mounted in a vehicle. The charging system includes a charger configured to supply electric power from a power supply external to the vehicle so as to charge the power storage device; and a charge control device for controlling the charger by generating a power command value to the charger. The charge control device includes a charge power detection unit for detecting charge power supplied to the power storage device; a target value determination unit for determining a target value of the charge power to the power storage device; a feedback control unit for correcting the target value based on a difference between the target value and the charge power to generate the power command value; and a supply power detection unit for detecting supply power output from the charger. The method includes the steps of: determining whether the charge power is decreased below a first threshold value and the supply power is decreased below a second threshold value; and confirming a diagnosis that an abnormality occurs in the charger when the target value falls within an abnormality detectable range, and suspending performing a diagnosis of an abnormality in the charger to shut down a system when the target value is out of the abnormality detectable range.

Effects of the Invention

The present invention serves to prevent an erroneous diagnosis that an abnormality occurs in the charger and also to avoid a needless system operation under the condition where charging cannot be carried out. In addition, during the normal operation, the number of opportunities where charging can be carried out may be increased.

DESCRIPTION OF THE REFERENCE SIGNS 19 current sensor, 20 voltage sensor, 22 auxiliary machine, 34 power split device, 36 engine, 38 driving wheel, 40 MG-ECU, 42 charger, 44 vehicle inlet, 46 charging ECU, 47 voltage sensor, 48 power supply, 51 charge power target value determination unit, 52 charge power detection unit, 53 subtraction unit, 54 feedback control unit, 55, 56, 57 addition unit, 61 charger supply power detection unit, 62 charge abnormality monitoring unit, 80 power limitation unit, 81 filter, 82 AC/DC conversion unit, 83 smoothing capacitor, 84 DC/AC conversion unit, 85 insulating transformer, 86 rectification unit, 87 temperature sensor, 88 microcomputer, 91, 93, 94 voltage sensor, 92, 95 current sensor, 100 hybrid vehicle, C, C1 smoothing capacitor, D1A, D1B diode, L1 inductor, LN1A positive bus, LN1B wiring, LN1C negative bus, MNL main negative bus, MPL main positive bus, NL1, NL2, NLC negative electrode line, PL1, PL2, PLC positive electrode line, Q1A, Q1B switching element.

BEST MODES FOR CARRYING OUT THE INVENTION

The embodiments of the present invention will be hereinafter described in detail with reference to the accompanying drawings, in which the same or corresponding components are designated by the same reference characters, and description thereof will not be repeated.

[Overall Configuration of Vehicle]

Figure 1:
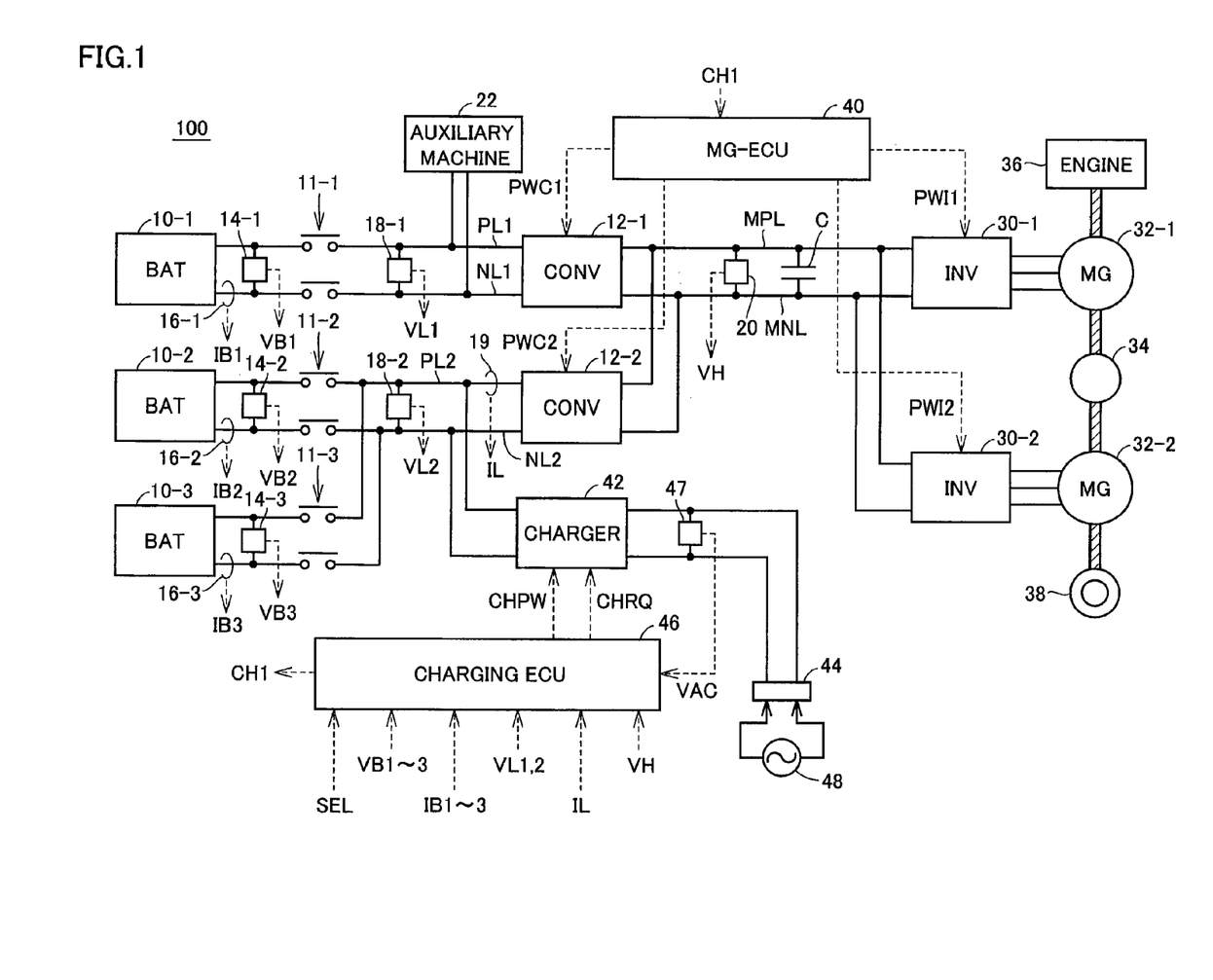
FIG. 1 is an overall block diagram of a hybrid vehicle shown as an example of an electric vehicle according to the present invention.

FIG. 1 is an overall block diagram of a hybrid vehicle shown as an example of an electric vehicle according to the present invention.

Referring to FIG. 1, a hybrid vehicle 100 includes power storage devices 10-1 to 10-3, system main relays 11-1 to 11-3, converters 12-1 and 12-2, a main positive bus MPL, a main negative bus MNL, a smoothing capacitor C, and an auxiliary machine 22. Hybrid vehicle 100 further includes inverters 30-1 and 30-2, motor generators 32-1 and 32-2, a power split device 34, an engine 36, and a driving wheel 38. Hybrid vehicle 100 further includes voltage sensors 14-1 to 14-3, 18-1, 18-2, and 20, current sensors 16-1 to 16-3 and 19, and an MG-ECU (electronic control unit) 40. Hybrid vehicle 100 also includes a charger 42, a vehicle inlet 44, and a charging ECU 46.

Each of power storage devices 10-1 to 10-3 serves as a rechargeable direct-current (DC) power supply including, for example, a secondary battery such as nickel-metal hydride or lithium-ion secondary battery, a large-capacity capacitor, and the like. Power storage device 10-1 is connected to converter 12-1 through system main relay 11-1. Power storage devices 10-2 and 10-3 are connected to converter 12-2 through system main relays 11-2 and 11-3, respectively.

System main relay 11-1 is provided between power storage device 10-1 and converter 12-1. System main relay 11-2 is provided between power storage device 10-2 and converter 12-2. System main relay 11-3 is provided between power storage device 10-3 and converter 12-2. In order to prevent a short circuit between power storage device 10-2 and power storage device 10-3, system main relays 11-2 and 11-3 are not simultaneously but selectively turned on.

Converters 12-1 and 12-2 are arranged in parallel with each other, and each connected to main positive bus MPL and main negative bus MNL. Based on a signal PWC1 from MG-ECU 40, converter 12-1 performs voltage conversion between power storage device 10-1 and main positive and negative busses MPL and MNL. Based on a signal PWC2 from MG-ECU 40, converter 12-2 performs voltage conversion between power storage device 10-2 or 10-3 electrically connected to converter 12-2 and main positive and negative busses MPL and MNL.

Auxiliary machine 22 is connected to a positive electrode line PL1 and a negative electrode line NL1 which are provided between system main relay 11-1 and converter 12-1. Smoothing capacitor C is connected between main positive bus MPL and main negative bus MNL, and serves to reduce the power variation component contained in main positive bus MPL and main negative bus MNL.

Inverters 30-1 and 30-2 are arranged in parallel with each other, and each connected to main positive bus MPL and main negative bus MNL. Inverter 30-1 drives motor generator 32-1 based on a signal PWI1 from MG-ECU 40. Inverter 30-2 drives motor generator 32-2 based on a signal PWI2 from MG-ECU 40.

Motor generators 32-1 and 32-2 each are an alternating-current (AC) rotating electric machine including, for example, a permanent magnet type synchronous electric motor provided with a rotor into which a permanent magnet is incorporated. Motor generators 32-1 and 32-2 are coupled to power split device 34. Power split device 34 includes a planetary gear having a sun gear, a pinion gear, a carrier, and a ring gear. The pinion gear engages with the sun gear and the ring gear. The carrier is coupled to the crankshaft of engine 36 while rotatably supporting the pinion gear. The sun gear is coupled to the rotation shaft of motor generator 32-1. The ring gear is coupled to the rotation shaft of motor generator 32-2 and driving wheel 38. Power split device 34 serves to split the power generated by engine 36 into a path through which the power is transmitted to driving wheel 38 and a path through which the power is transmitted to motor generator 32-1.

Motor generator 32-1 generates electric power using the power of engine 36 split by power split device 34. For example, when the state of charge (SOC) of each of power storage devices 10-1 to 10-3 decreases, engine 36 is started and motor generator 32-1 generates electric power, which is then supplied to the power storage device.

In contrast, motor generator 32-2 generates driving force by using at least one of the electric power supplied from at least one of power storage devices 10-1 to 10-3 and the electric power generated by motor generator 32-1. The driving force of motor generator 32-2 is transmitted to driving wheel 38. During braking of the vehicle, the kinetic energy of the vehicle is transmitted from driving wheel 38 to motor generator 32-2 which is then driven to operate as a power generator. Thus, motor generator 32-2 operates as a regenerative brake for converting the kinetic energy of the vehicle into electric power for collection.

MG-ECU 40 generates signals PWC1 and PWC2 for driving converters 12-1 and 12-2, respectively, and outputs the generated signals PWC1 and PWC2 to converters 12-1 and 12-2, respectively. MG-ECU 40 also generates signals PWI1 and PWI2 for driving motor generators 32-1 and 32-2, respectively, and outputs the generated signals PWI1 and PWI2 to inverters 30-1 and 30-2, respectively.

Furthermore, in the case where power storage device 10-1 is charged by charger 42, when a signal CH1 received from charging ECU 46 is activated, MG-ECU 40 generates and outputs signals PWC1 and PWC2 to converters 12-1 and 12-2, respectively, such that charge power may be supplied from charger 42 sequentially through converter 12-2, main positive bus MPL and main negative bus MNL, and converter 12-1 to power storage device 10-1.

Charger 42 has an input terminal connected to vehicle inlet 44 and has an output terminal connected to a positive electrode line PL2 and a negative electrode line NL2 which are disposed between converter 12-2 and system main relays 11-2 and 11-3. Charger 42 receives the electric power supplied from a power supply 48 external to the vehicle (hereinafter also referred to as an "external power supply") through vehicle inlet 44. Charger 42 then receives a power command value CHPW from charging ECU 46 to control the output voltage of charger 42 to be set at a predetermined DC voltage and also control the output power of charger 42 to be equal to power command value CHPW. Vehicle inlet 44 serves as a power interface for receiving electric power from external power supply 48.

Voltage sensors 14-1 to 14-3 detect a voltage VB1 of power storage device 10-1, a voltage VB2 of power storage device 10-2 and a voltage VB3 of power storage device 10-3, respectively, and then output the detected values to charging ECU 46. Current sensors 16-1 to 16-3 detect a current IB1 input to and output from power storage device 10-1, a current IB2 input to and output from power storage device 10-2, and a current IB3 input to and output from power storage device 10-3, respectively, and then output the detected values to charging ECU 46.

Voltage sensors 18-1 and 18-2 detect a voltage VL1 between positive electrode line PL1 and negative electrode line NL1, and a voltage VL2 between positive electrode line PL2 and negative electrode line NL2, respectively, and then output the detected values to charging ECU 46. Current sensor 19 detects a current IL on positive electrode line PL2 input to and output from converter 12-2, and then outputs the detected value to charging ECU 46. It is to be noted that current sensor 19 can detect the current flowing from charger 42 into converter 12-2 when power storage device 10-1 is charged by charger 42. Voltage sensor 20 detects a voltage VH between main positive bus MPL and main negative bus MNL, and then outputs the detected value to charging ECU 46.

When power storage devices 10-1 to 10-3 are charged by external power supply 48 connected to vehicle inlet 44, charging ECU 46 receives a target value PR of the charge power (kW/h) of power storage devices 10-1 to 10-3 from a vehicle ECU which is not shown. Charging ECU 46 also receives, from the above-described vehicle ECU, a signal SEL indicating as to which of power storage devices 10-1 to 10-3 is charged by charger 42. In other words, in the first embodiment, power storage devices 10-1 to 10-3 are charged sequentially in the predetermined order.

When power storage device 10-1 is charged, charging ECU 46 outputs signal CH1 to MG-ECU 40, and converters 12-1 and 12-2 operate so as to cause the electric power to flow from charger 42 sequentially through converters 12-2 and 12-1 into power storage device 10-1. In this case, when power storage device 10-1 is charged, auxiliary machine 22 connected between power storage device 10-1 and converter 12-1 operates with the electric power supplied from charger 42. In contrast, when power storage device 10-2 or 10-3 is charged, auxiliary machine 22 receives electric power from power storage device 10-1.

When external power supply 48 charges power storage devices 10-1 to 10-3, charging ECU 46 generates power command value CHPW indicative of the target value of the electric power output from charger 42, and outputs the generated power command value CHPW to charger 42.

Then, charging ECU 46 receives the detected value of each of voltages VB1 to VB3, VL1, VL2 and VH, and currents IB1 to IB3 and IL. Based on each of the above detected values, charging ECU 46 performs feedback correction for power command value CHPW of charger 42 such that the charge power actually supplied to power storage devices 10-1 to 10-3 is equal to target value PR. In other words, in the present embodiment, not only charger 42 is controlled such that the output power of charger 42 is equal to the target value, but also power command value CHPW is feedback-corrected based on the state of the power storage device such that the actual charge power of the power storage device is equal to the target value. This allows the charge power of power storage devices 10-1 to 10-3 to be equal to target value PR with reliability.

Hybrid vehicle 100 further includes a voltage sensor 47 detecting a voltage VAC which is input from external power supply 48. Charging ECU 46 receives the detection result provided from voltage sensor 47. Charging ECU outputs power command value CHPW to charger 42 and also outputs, to charger 42, a control signal CHRQ used for controlling charger 42 to be turned on and off.

Figure 2:
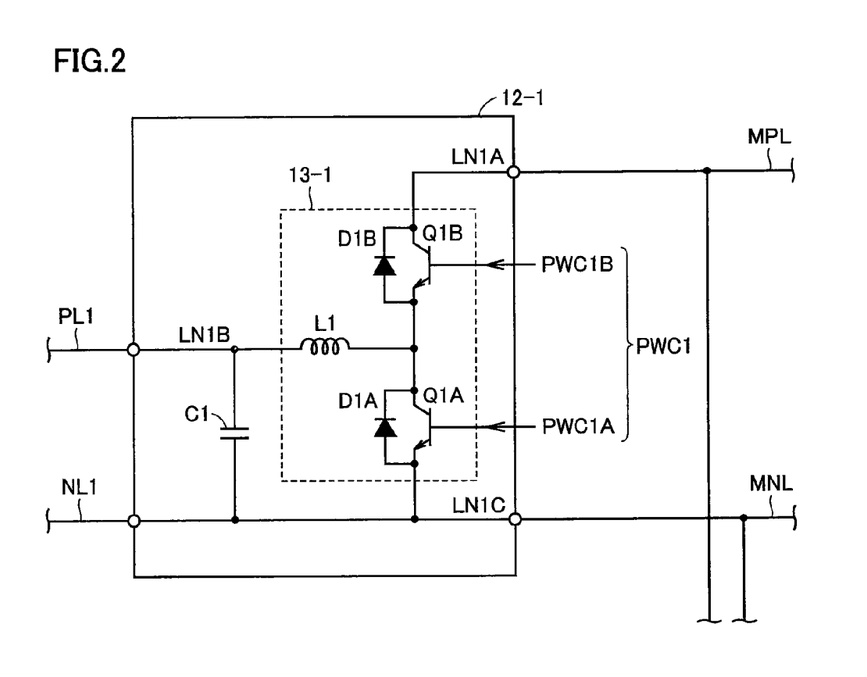
FIG. 2 is a schematic configuration diagram of converters 12-1 and 12-2 shown in FIG. 1.

FIG. 2 is a schematic configuration diagram of converters 12-1 and 12-2 shown in FIG. 1. Since the configuration and operation of each of the converters are the same, the configuration and operation of converter 12-1 will be hereinafter described as a representative example.

Referring to FIG. 2, converter 12-1 includes a chopper circuit 13-1, a positive bus LN1A, a negative bus LN1C, a wiring LN1B, and a smoothing capacitor C1. Chopper circuit 13-1 includes switching elements Q1A, Q1B, diodes D1A, D1B, and an inductor L1.

Positive bus LN1A has one end connected to a collector of switching element Q1B and the other end connected to main positive bus MPL. Negative bus LN1C has one end connected to negative electrode line NL1 and the other end connected to main negative bus MNL.

Switching elements Q1A and Q1B are connected in series between negative bus LN1C and positive bus LN1A. Specifically, the emitter of switching element Q1A is connected to negative bus LN1C, and the collector of switching element Q1B is connected to positive bus LN1A. Diodes D1A and D1B are connected in reverse parallel with switching elements Q1A and Q1B, respectively. Inductor L1 is connected between wiring LN1B and the connection node of switching elements Q1A and Q1B.

Wiring LN1B has one end connected to positive electrode line PL1 and the other end connected to inductor L1. Smoothing capacitor C1 is connected between wiring LN1B and negative bus LN1C, and reduces an AC component contained in the DC voltage between wiring LN1B and negative bus LN1C.

In accordance with signal PWC1 from MG-ECU 40 (FIG. 1), chopper circuit 13-1 performs bidirectional DC voltage conversion between power storage device 10-1 (FIG. 1) and main positive and negative busses MPL and MNL. Signal PWC1 contains a signal PWC1A used for controlling switching element Q1A forming a lower arm element to be turned on and off, and a signal PWC1B used for controlling switching element Q1B forming an upper arm element to be turned on and off. MG-ECU 40 then controls the duty ratio (the ratio between the on-period and the off-period) of each of switching elements Q1A, Q1B within a certain duty cycle (the sum of the on-period and the off-period).

When switching elements Q1A and Q1B are controlled such that the on-duty of switching element Q1A is increased (since switching elements Q1A and Q1B are controlled to be complementarily turned on/off except for the dead time period, the on-duty of switching element Q1B is decreased), the amount of the pump current flowing from power storage device 10-1 through inductor L1 increases, which causes an increase in the electromagnetic energy accumulated in inductor L1. This results in an increase in the amount of the current discharged from inductor L1 through diode D1B to main positive bus MPL at the timing when switching element Q1A is switched from the ON state to the OFF state, and thus, the voltage on main positive bus MPL is increased.

In contrast, when switching elements Q1A and Q1B are controlled such that the on-duty of switching element Q1B is increased (the on-duty of switching element Q1A is decreased), the amount of the current flowing from main positive bus MPL through switching element Q1B and inductor L1 into power storage device 10-1 increases, which causes a decrease in the voltage on main positive bus MPL.

Thus, by controlling the duty ratio of each of switching elements Q1A and Q1B, the voltage on main positive bus MPL can be controlled, and the direction of the current (electric power) and the amount of the current (amount of the electric power) flowing between power storage device 10-1 and main positive bus MPL can also be controlled.

Figure 3:
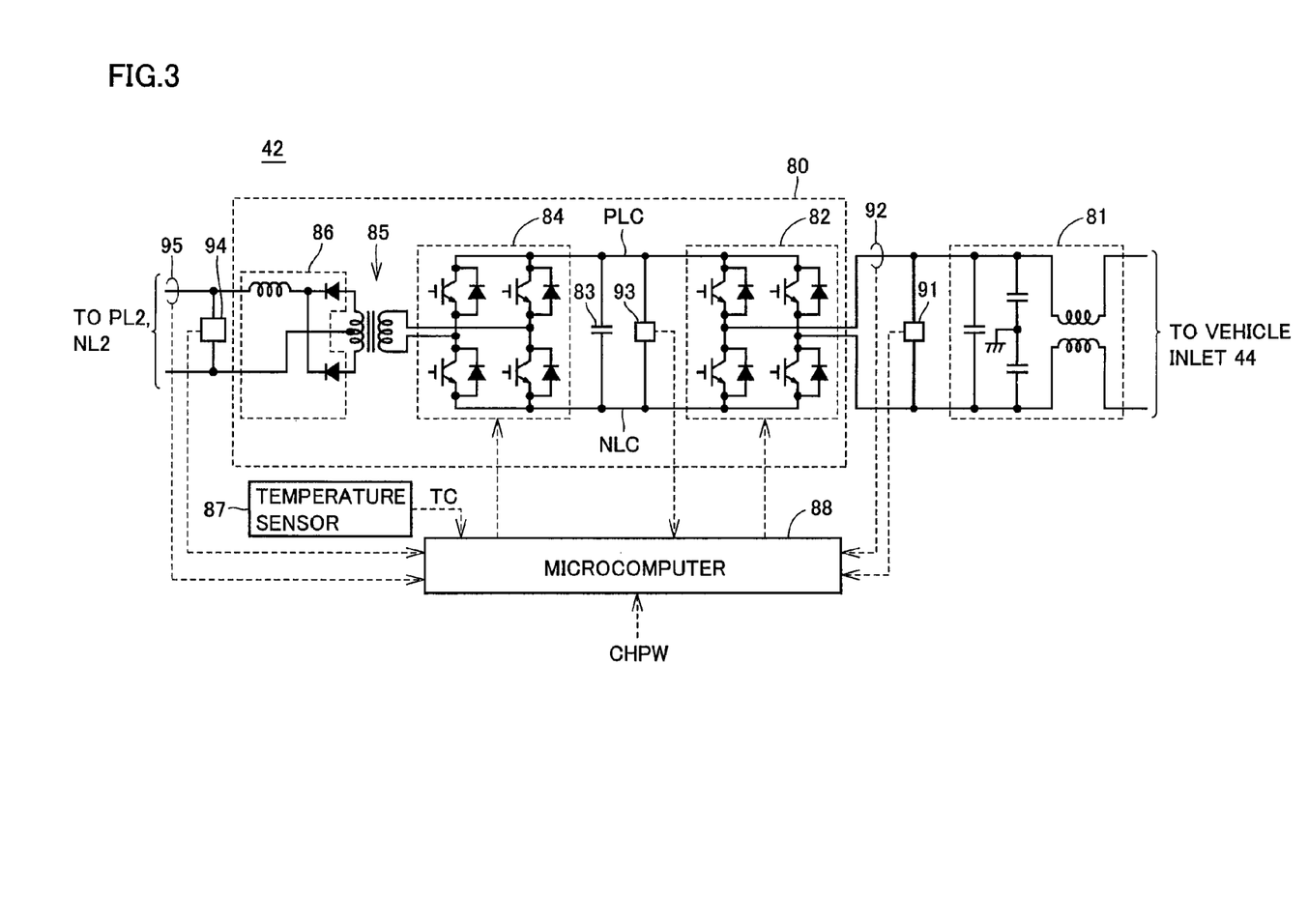
FIG. 3 is a schematic configuration diagram of a charger 42 shown in FIG. 1.

FIG. 3 is a schematic configuration diagram of charger 42 shown in FIG. 1.

Referring to FIG. 3, charger 42 includes a filter 81, a power limitation unit 80, a temperature sensor 87, voltage sensors 91, 93 and 94, current sensors 92 and 95, and a microcomputer 88.

Power limitation unit 80 includes an AC/DC conversion unit 82, a smoothing capacitor 83, a DC/AC conversion unit 84, an insulating transformer 85, and a rectification unit 86.

Filter 81 is disposed between vehicle inlet 44 (FIG. 1) and AC/DC conversion unit 82, and prevents vehicle inlet 44 from outputting high frequency noise to external power supply 48 during charging of power storage devices 10-1 to 10-3 by external power supply 48 (FIG. 1). AC/DC conversion unit 82 includes a single-phase bridge circuit. Based on the drive signal from microcomputer 88, AC/DC conversion unit 82 converts the AC power supplied from external power supply 48 into a DC power, which is then output to a positive electrode line PLC and a negative electrode line NLC. Smoothing capacitor 83 connected between positive electrode line PLC and negative electrode line NLC serves to reduce the power variation component contained between positive electrode line PLC and negative electrode line NLC.

DC/AC conversion unit 84 includes a single-phase bridge circuit. Based on the drive signal from microcomputer 88, DC/AC conversion unit 84 converts the DC power supplied through positive electrode line PLC and negative electrode line NLC into an AC power of high frequency, which is then output to insulating transformer 85. Insulating transformer 85 includes a core containing magnetic material, and a primary coil and a secondary coil which are wound around the core. The primary and secondary coils are electrically insulated and connected to DC/AC conversion unit 84 and rectification unit 86, respectively. Insulating transformer 85 converts the AC power of high frequency supplied from DC/AC conversion unit 84 into the voltage level in accordance with the turns ratio between the primary coil and the secondary coil, and outputs the resultant to rectification unit 86. Rectification unit 86 rectifies the AC power output from insulating transformer 85 to a DC power, which is then output to positive electrode line PL2 and negative electrode line NL2.

Voltage sensor 91 detects the voltage of external power supply 48 which has been passed through filter 81, and outputs the detected value to microcomputer 88. Current sensor 92 detects the current supplied from external power supply 48, and outputs the detected value to microcomputer 88. Voltage sensor 93 detects the voltage between positive electrode line PLC and negative electrode line NLC, and outputs the detected value to microcomputer 88. Voltage sensor 94 detects the voltage on the output side of rectification unit 86, and outputs the detected value to microcomputer 88. Current sensor 95 detects the current output from rectification unit 86, and outputs the detected value to microcomputer 88.

Based on the detected values from voltage sensors 91, 93 and 94 and current sensors 92 and 95, microcomputer 88 generates a drive signal used for driving AC/DC conversion unit 82 and DC/AC conversion unit 84 such that the output power of charger 42 calculated based on the detected values from voltage sensor 94 and current sensor 95 is equal to power command value CHPW. Microcomputer 88 then outputs the generated drive signal to AC/DC conversion unit 82 and DC/AC conversion unit 84.

Temperature sensor 87 detects whether the condition of the power-saving operation that charger 42 may possibly become overheated is satisfied or not. Specifically, temperature sensor 87 detects and transmits a temperature TC of charger 42 to microcomputer 88. Microcomputer 88 changes the operation mode of charger 42 between the saving mode and the normal mode based on temperature TC transmitted from temperature sensor 87. Power limitation unit 80 limits the electric power from the power supply external to the vehicle under the control by microcomputer 88, and supplies the resultant electric power as charge power to power storage devices 10-1 to 10-3.

Figure 4:
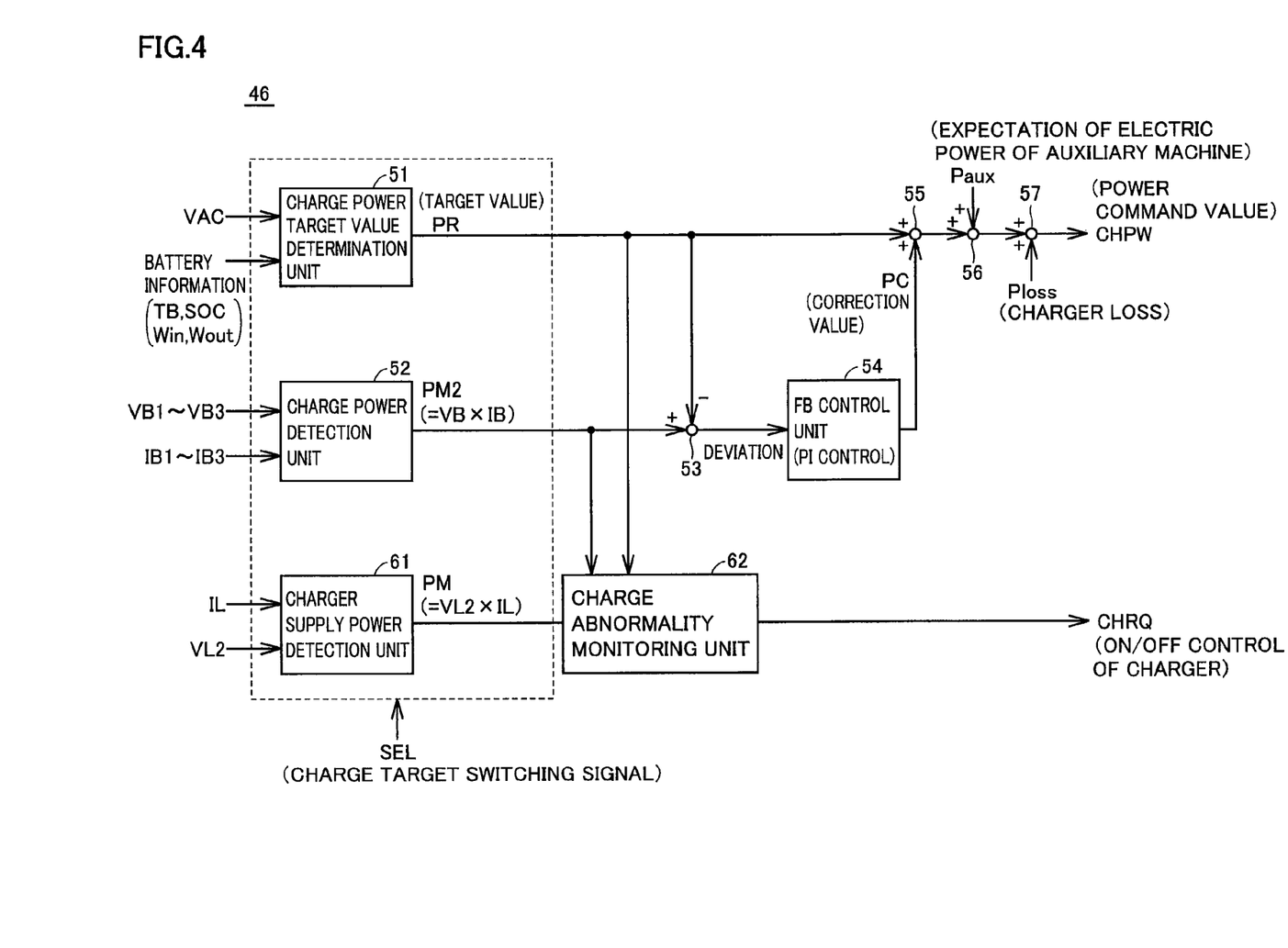
FIG. 4 is a functional block diagram of a charging ECU 46 shown in FIG. 1.

FIG. 4 is a functional block diagram of charging ECU 46 shown in FIG. 1.

Referring to FIG. 4, charging ECU 46 includes a charge power target value determination unit 51, a charge power detection unit 52, and a charger supply power detection unit 61. Charge power target value determination unit 51 outputs target value PR of the electric power which should be supplied to the battery, based on a detected value VAC provided from voltage sensor 47 in FIG. 1 and the battery information (a battery temperature TV, a state of charge SOC, a charge power limitation value Win, a discharge power limitation value Wout, and the like) provided from a battery ECU which is not shown.

Charge power target value determination unit 51 sets charge target power PR in accordance with detected value VAC (100V/200V). It also sets a target power PW to be relatively large (quick charge) when state of charge SOC is low, and sets target charge power PR to be relatively small (forced charge) when state of charge SOC is high. However, when charge limitation upper limit value Win is set to be relatively small in accordance with the battery temperature and the like, target charge power PW is limited thereto.

When power storage device 10-1 is charged by charger 42, charge power detection unit 52 refers to the charge power of power storage device 10-1 based on the detected values of voltage VB1 and current IB1, and outputs the calculation result as a monitor value PM2. In addition, based on signal SEL transmitted from vehicle ECU which is not shown, it is determined that power storage device 10-1 is charged by charger 42.

Furthermore, when power storage device 10-2 is charged by charger 42, charge power detection unit 52 refers to the charge power of power storage device 10-2 based on the detected values of voltage VB2 and current IB, and outputs the calculation result as monitor value PM2. When power storage device 10-3 is charged by charger 42, charge power detection unit 52 calculates the charge power of power storage device 10-3 based on the detected values of voltage VB3 and current IB3, and outputs the calculation result as monitor value PM2.

Based on current IL and voltage VL2 detected by current sensor 19 and voltage sensor 18-2, respectively, in FIG. 1, charger supply power detection unit 61 detects and outputs the electric power supplied from charger 42 as a monitor value PM.

Charging ECU 46 further includes a charge abnormality monitoring unit 62, a subtraction unit 53, a feedback control unit 54, and addition units 55, 56 and 57. Subtraction unit 53 subtracts target value PR from monitor value PM2, and provides the calculation result to feedback control unit 54. Feedback control unit 54 performs proportional-plus-integral control based on the deviation provided from subtraction unit 53, and outputs a correction value PC for target value PR. Addition unit 55 adds correction value PC to target value PR. Addition unit 56 adds an expected value Paux of the electric power consumed by auxiliary machine 22 in FIG. 1 to the calculation result of addition unit 55. Addition unit 57 adds a charge loss Ploss of charger 42 to the calculation result of addition unit 56, and calculates power command value CHPW which is output to charger 42.

Based on monitor values PM and PM2 and target value PR, charge abnormality monitoring unit 62 outputs control signal CHRQ used for controlling charger 42 to be turned on and off.

Figure 5:
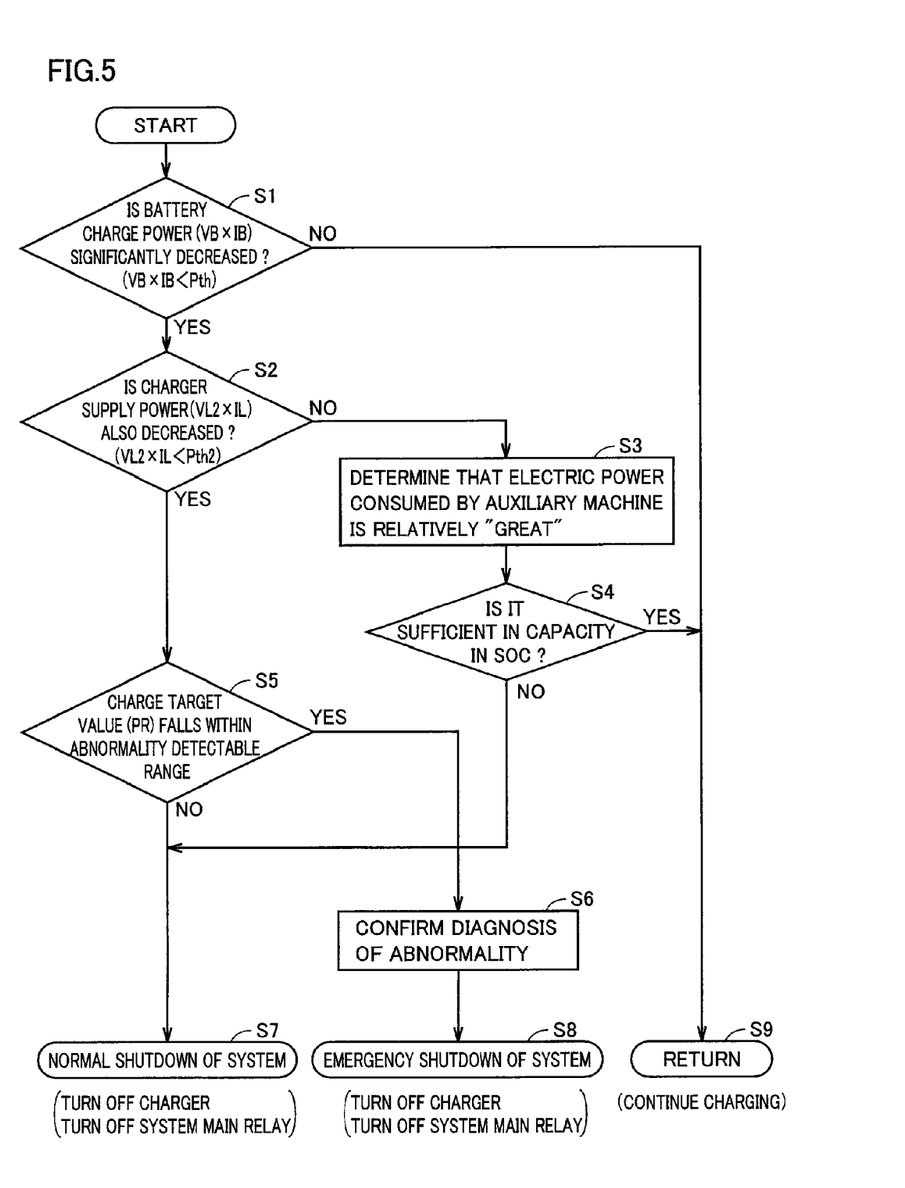
FIG. 5 is a flowchart for illustrating the control operation performed in a charge abnormality monitoring unit 62 in FIG. 4.

FIG. 5 is a flowchart for illustrating the control operation performed in charge abnormality monitoring unit 62 in FIG. 4.

Referring to FIG. 5, first in step S1, it is determined whether the battery charge power (VB×IB) is significantly decreased. In other words, it is determined whether a product VB×IB of the current and the voltage of the battery that is to be charged is smaller than a predetermined Pth.

Figure 6:
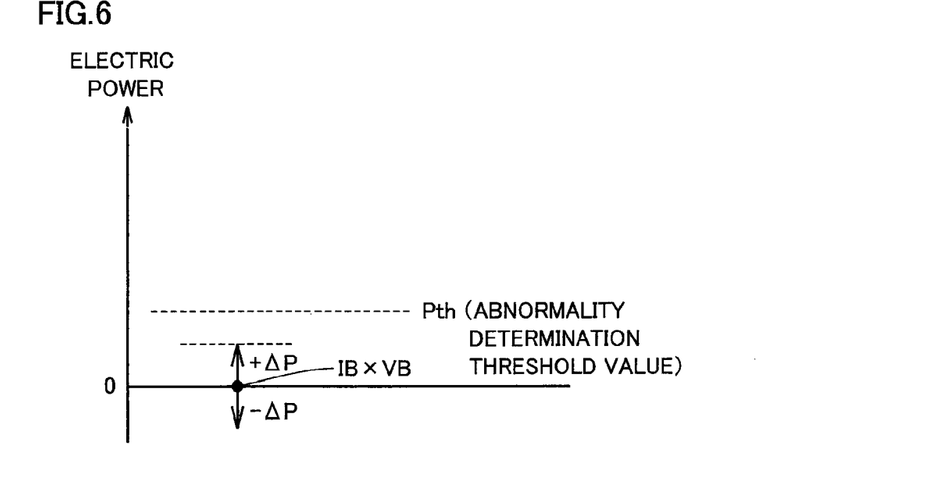
FIG. 6 is a diagram for illustrating setting of a threshold value Pth used in step S1 in FIG. 5.

FIG. 6 is a diagram for illustrating setting of a threshold value Pth used in step S1 in FIG. 5.

Referring to FIG. 6, even when the charge power, that is, IB×VB, is equal to 0 (abnormality), the sensor used for detection thereof exhibits variations which may be detected as ΔP. Accordingly, threshold value Pth is set to be greater than sensor variation ΔP, which allows reliable detection of the abnormality showing the condition that charge power IB×VB=0 in step S1.

Referring back to FIG. 5, in step S1, in the case where the condition that VB×IB<Pth is not satisfied, the process proceeds to step S9 and the control is passed to the main routine for continuation of charging.

On the other hand, in the case where the condition that VB×IB<Pth is satisfied in step S1, the process proceeds to step S2. In step S2, it is determined whether the charger supply power (VL2×IL) is also decreased. In other words, it is determined whether the product of voltage value VL2 and detected value IL detected by voltage sensor 18-2 and current sensor 19, respectively, in FIG. 1 is smaller than a predetermined threshold value Pth2.

In the case where the condition that VL2×IL<Pth2 is not satisfied in step S2, the process proceeds to step S3. In step S3, it is determined that auxiliary machine 22 consumes a relatively great amount of electric power since the electric power supplied from the charger is not decreased even though the electric power supplied to the battery is decreased. Then, it is determined in step S4 whether power storage device 10-1 is still sufficient in capacity in state of charge SOC.

In the case where the auxiliary machine consumes a "great" amount of electric power, it is considered that power storage device 10-1 may possibly discharge the current to auxiliary machine 22 to thereby cause a decrease in state of charge SOC. Since power storage device 10-1 serves as a master battery of the hybrid system, an excessive decrease in the state of charge may interfere with the driving of the vehicle. Accordingly, when it is determined in step S4 that power storage device 10-1 is still sufficient in capacity in state of charge SOC, the process proceeds to step S9 and charging is continued. On the other hand, when it is not determined in step S4 that power storage device 10-1 is still sufficient in capacity in state of charge SOC, in other words, when state of charge SOC is decreased below the predetermined threshold value, the process proceeds to step S7 and the system is normally shut down. When the system is normally shut down, the operation of charger 42 is turned off and system main relays 11-1 to 11-3 are controlled to be turned off.

Then in step S2, when the condition that VL2×IL<Pth2 is satisfied, the process proceeds to step S5. In step S5, it is determined whether charge target value PR falls within the abnormality detectable range.

Figure 7:
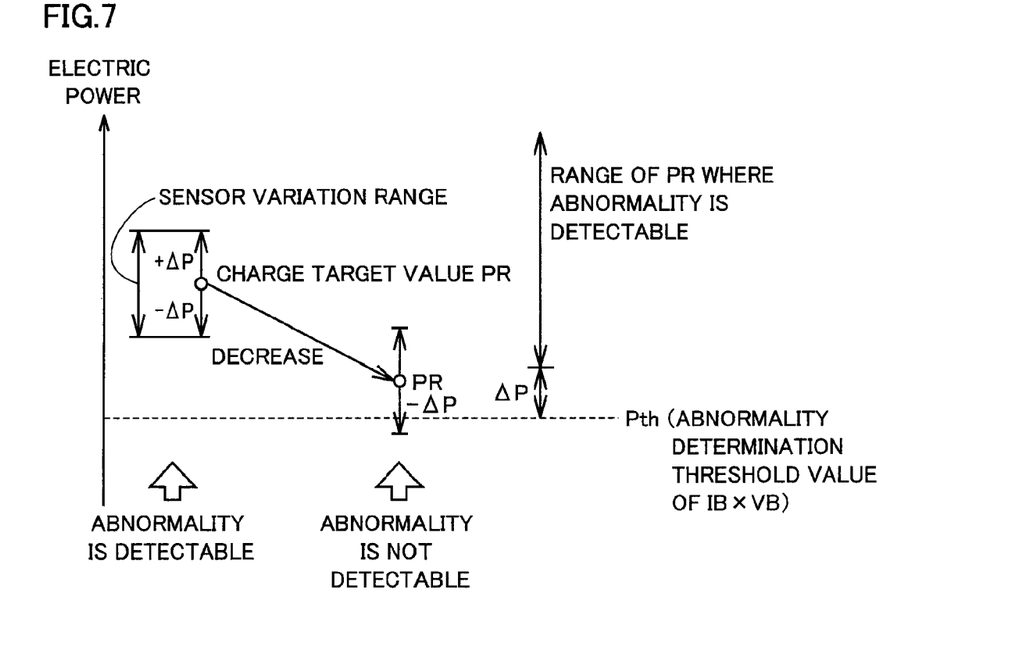
FIG. 7 is a diagram for illustrating an abnormality detectable range of a charge target value PR in step S5 in FIG. 5.

FIG. 7 is a diagram for illustrating the abnormality detectable range of charge target value PR in step S5 in FIG. 5.

Referring to FIG. 7, the actual value lies somewhere within the range of ±ΔP of the sensor variation with respect to charge target value PR. Accordingly, the value less than charge target value PR by variation ΔP is greater than abnormality determination threshold value Pth, in which case it can be said that an abnormality is detectable. In contrast, an excessive decrease in charge target value PR causes the difference between charge target value PR and the abnormality determination threshold value to fall within variation ΔP, in which case it is considered that an abnormality in the charger is not detectable. In other words, abnormality detection cannot be made unless the range of charge target value PR allowing abnormality detection is greater than or equal to abnormality determination threshold value Pth of electric power IB×VB by ΔP determined by the sensor variation.

Referring back to FIG. 5, in step S5, when charge target value PR does not fall within the abnormality detectable range, the process proceeds to step S7 and the process of normally shutting down the system is carried out. In other words, charger 42 is controlled to be turned off and system main relays 11-1 to 11-3 are controlled to be turned off.

This is the case where, for example, the power storage device is at an extremely low temperature and the charge power is significantly limited, with the result that the decrease in the charge power in step S1 and the decrease in the charger supply power in step S2 are detected. In this case, it is inappropriate to determine that an abnormality occurs in the charger, and therefore, the process of confirming an abnormality diagnosis is not carried out in order to prevent an erroneous detection of an abnormality in the system.

When it is determined in step S5 that charge target value PR falls within the abnormality detectable range, the process proceeds to step S6. In step S6, the diagnosis is confirmed that an abnormality occurs in the charger. In step S8, an emergency shutdown of the system is carried out. In the event of the emergency shutdown of the system, charger 42 is controlled to be turned off and system main relays 11-1 to 11-3 are also controlled to be turned off.

As described above, the present embodiments serve to prevent an erroneous diagnosis that an abnormality occurs in the charger and also to avoid a needless system operation under the condition where charging cannot be carried out. Furthermore, during the normal operation, the number of opportunities where charging can be carried out is increased.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A charging system for a vehicle for charging a power storage device mounted in the vehicle, said charging system comprising:
a charger configured to supply electric power from a power supply external to the vehicle so as to charge said power storage device; and
a charge control device for controlling said charger by generating a power command value to said charger,
said charge control device including
a charge power detection unit for detecting charge power supplied to said power storage device,
a target value determination unit for determining a target value of the charge power to said power storage device,
a feedback control unit for correcting said target value based on a difference between said charge power and said target value to generate said power command value,
a supply power detection unit for detecting supply power output from said charger, and
a charge abnormality monitoring unit for, in a case where said charge power is decreased below a first threshold value and said supply power is decreased below a second threshold value, confirming a diagnosis that an abnormality occurs in said charger when said target value falls within an abnormality detectable range, and suspending performing a diagnosis of an abnormality in said charger when said target value is out of the abnormality detectable range.

2. The charging system for a vehicle according to claim 1, wherein, in the case where said charge power is decreased below the first threshold value and said supply power is decreased below the second threshold value, said charge abnormality monitoring unit confirms a diagnosis that an abnormality occurs in said charger and stops an operation of said charger when said target value falls within the abnormality detectable range, and suspends performing a diagnosis of an abnormality in said charger and stops the operation of said charger when said target value is out of the abnormality detectable range.

3. The charging system for a vehicle according to claim 1, wherein
said vehicle includes an auxiliary machine capable of being driven by a part of the electric power output from said charger,
said power storage device includes
a first power storage device connected to a power supply path to said auxiliary machine, and
a second power storage device to which an output of said charger is connected,
said charging system for a vehicle further includes
a first voltage converter performing voltage conversion between a voltage of said first power storage device and a supply voltage to an electric load, and
a second voltage converter performing voltage conversion between a voltage of said second power storage device and said supply voltage, and
said charge control device is configured to control said first and second voltage converters to select one of said first and second power storage devices as a target to be supplied with said charge power from said charger.

4. The charging system for a vehicle according to claim 1, wherein
said vehicle includes
a motor for driving the vehicle, said motor operating with the electric power received from said power storage device, and
an internal combustion engine used for driving the vehicle in combination with said motor.

5. A method for controlling a charging system for charging a power storage device mounted in a vehicle,
said charging system including
a charger configured to supply electric power from a power supply external to the vehicle so as to charge said power storage device, and
a charge control device for controlling said charger by generating a power command value to said charger, and
said charge control device including
a charge power detection unit for detecting charge power supplied to said power storage device,
a target value determination unit for determining a target value of the charge power to said power storage device,
a feedback control unit for correcting said target value based on a difference between said target value and said charge power to generate said power command value, and
a supply power detection unit for detecting supply power output from said charger, said method comprising the steps of:
determining whether said charge power is decreased below a first threshold value and said supply power is decreased below a second threshold value; and
confirming a diagnosis that an abnormality occurs in said charger when said target value falls within an abnormality detectable range, and suspending performing a diagnosis of an abnormality in said charger to shut down a system when said target value is out of the abnormality detectable range.

\* \* \* \* \*